(12) United States Patent
Baek et al.

(10) Patent No.: US 8,364,083 B2
(45) Date of Patent: Jan. 29, 2013

(54) PRIORITY-BASED WIRELESS USB TRANSFER SERVICE MANAGEMENT APPARATUS AND METHOD THEREOF

(75) Inventors: Seung Ho Baek, Daejeon (KR); Eun Chang Choi, Daejeon (KR); Jae Doo Huh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 567 days.

(21) Appl. No.: 12/517,489

(22) PCT Filed: Dec. 3, 2007

(86) PCT No.: PCT/KR2007/006215
§ 371 (c)(1),
(2), (4) Date: Jun. 3, 2009

(87) PCT Pub. No.: WO2008/069528
PCT Pub. Date: Jun. 12, 2008

(65) Prior Publication Data
US 2010/0069006 A1    Mar. 18, 2010

(30) Foreign Application Priority Data

Dec. 4, 2006   (KR) .................. 10-2006-0121320
Aug. 3, 2007   (KR) .................. 10-2007-0078191

(51) Int. Cl.
*H04B 7/00* (2006.01)
(52) U.S. Cl. ............... 455/41.3; 455/63.1; 455/41.1; 455/41.2; 455/12.1; 455/450; 370/342; 370/468; 370/329; 370/347; 370/356; 709/203; 709/202; 709/223
(58) Field of Classification Search ............ 455/63.1, 455/41.2, 12.1, 450; 370/342, 468, 329, 370/347, 395.4, 356, 465, 401, 344, 412; 709/203, 202, 223
See application file for complete search history.

(56) References Cited

U.S. PATENT DOCUMENTS
(Continued)

FOREIGN PATENT DOCUMENTS
JP    2006-268845      10/2006
KR    10-2004-0104242  12/2004
(Continued)

OTHER PUBLICATIONS

Chih-Yuan Huang et al., "QoS Support for USB 2.0 Periodic and Sporadic Device Requests", Real-Time System Symposium, 2004, Proceedings. 25$^{th}$ IEEE International, Dec. 5-8, pp. 395-404.

(Continued)

*Primary Examiner* — Matthew Anderson
*Assistant Examiner* — Ganiyu A Hanidu
(74) *Attorney, Agent, or Firm* — Staas & Halsey LLP

(57) ABSTRACT

A priority-based wireless USB transfer service management apparatus and method capable of preventing conflict or interference between service and minimizing waste of resources by providing optimized service supporting environment according to characteristics and media classes of various wireless USB devices are provided. In the priority-based wireless USB transfer service management apparatus and method, wireless data transmitted from wireless USB devices are integrated according to service classes, service management information is configured by identifying the wireless data according to associated protocols, services are classified based on the service management information, priorities and weighting factors are allocated according to the services, final service determination information is configured based on a user's request, and a to-be-performed service is determined based on the final service determination information, so that the determined service is controlled to be performed.

10 Claims, 7 Drawing Sheets

U.S. PATENT DOCUMENTS

| | | | |
|---|---|---|---|
| 7,627,098 B2 * | 12/2009 | Baik et al. | 379/102.05 |
| 2003/0086388 A1 | 5/2003 | Peters et al. | |
| 2003/0099301 A1 | 5/2003 | Green | |
| 2004/0002838 A1 * | 1/2004 | Oliver et al. | 703/2 |
| 2004/0054726 A1 * | 3/2004 | Doss et al. | 709/205 |
| 2004/0203378 A1 | 10/2004 | Powers | |
| 2004/0246909 A1 | 12/2004 | Ahn | |
| 2005/0113021 A1 | 5/2005 | Gosieski, Jr. et al. | |
| 2005/0141465 A1 * | 6/2005 | Kato et al. | 370/337 |
| 2006/0123181 A1 | 6/2006 | Aull et al. | |
| 2006/0166621 A1 | 7/2006 | Bae et al. | |
| 2006/0195552 A1 | 8/2006 | Nampei | |
| 2007/0073935 A1 | 3/2007 | Kim et al. | |
| 2007/0097878 A1 * | 5/2007 | Morioka et al. | 370/254 |
| 2008/0056184 A1 * | 3/2008 | Green | 370/329 |
| 2009/0254685 A1 * | 10/2009 | Diepstraten et al. | 710/106 |

FOREIGN PATENT DOCUMENTS

| | | |
|---|---|---|
| KR | 10-0647906 | 11/2006 |
| KR | 10-2007-009288 | 1/2007 |
| KR | 10-0703791 | 3/2007 |

OTHER PUBLICATIONS

Jeng Farn Lee et al., "A Per-Class QoS Service Model in IEEE 802.11e WLANs", Quality of Service in Heterogeneous Wired/Wireless Networks, 2005, 8 pages.

International search Report for PCT/KR2007/006215, mailed Mar. 13, 2008.

Korean Office Action issued Nov. 24, 2008 in corresponding Korean Patent Application 10-2007-0078191.

* cited by examiner

| SERVICE INFORMATION BASE |||
| --- | --- | --- |
| CLASS | SERVICE APPARATUS | TRANSFER ATTRIBUTE |
| Video | Camcorder | Streaming |
| Audio | Voice | Bulk – Excellent |
| Communication | Modem | Background |
| HID | Keyboard, mouse | Interrupt – Excellent |
| Image | Camera, Scanners | Bulk – standard |
| PID | Joystick | Interrupt – standard |
| Printer | Printer, IEEE1284 devices | Bulk – Best Effort |
| Storage | Drive, memory, bulk | Bulk – Best Effort |

PRIORITY-BASED WIRELESS USB TRANSFER SERVICE MANAGEMENT APPARATUS AND METHOD THEREOF

CROSS REFERENCE TO RELATED APPLICATIONS

This application claims the benefit under 35 U.S.C. Section 371, of PCT International Application Number PCT/KR2007/006215, filed Dec. 3, 2007 and Korean Application Nos. 10-2006-0121320, filed Dec. 4, 2006 and 10-2007-0078191, filed Aug. 3, 2007, the contents of all of which are incorporated herein by reference.

TECHNICAL FIELD

The present invention relates to a wireless USB transfer service management apparatus and method for supporting various media services associated with wireless USB data transfer.

The present invention was supported by the IT R&D program of MIC/IITA. [2004-S-605, "Development of HD level interactive multimedia service technology over wireless home network"]

BACKGROUND ART

Wireless universal serial bus (USB) is a wireless version of a USB which is an external peripheral interface standard for serial communication between a computer and external peripherals such an audio player, a joystick, a keyboard, a telephone, a scanner, a printer, and the like. At present, standardization for the Wireless USB has proceeded.

The wireless USB is implemented by using a ultra wideband (UWB). In the structure of the wireless USB, a hub is centralized, and wireless UBS devices are connected to a point-to-point manner.

The wireless USB based home network environment is configured in connection between a limited host and various devices.

The home service environment needs to be configured so that one host limited can provide various services to the users.

FIG. 1 is a block diagram illustrating a wireless USB based home network system 10.

Referring to FIG. 1, the wireless USB based home network system 10 includes a wireless USB host 11 for controlling a data transfer service between a plurality of wireless USB devices. As the wireless USB device controlled by the wireless USB host 11 to receives and transmit a wireless USB data, there are a video wireless USB device 12 provided to a video apparatus such as a camcorder to receive and transmit a video data, a storage apparatus wireless USB device 13 provided to various storage apparatuses, a wireless USB hub 14 for relaying a plurality of the wireless USB devices, an audio wireless USB device 15 connected to an audio apparatus such as an MP2 player, and a image wireless USB device 16 connected to an image apparatus such as a camera.

The wireless USB based home network system 10 provides settings of wireless connection between the wireless USB host and the wireless USB devices in order to perform wireless USB transfer service.

In general, a USB transfer service is an event generated between the host and the device according to an accessing order and a user's intension. The USB transfer service is configured in a symmetric structure. The concept of the USB transfer service is also used for the wireless USB transfer service. Various wireless USB devices share one UWB wireless channel. The UWB wireless channel is provided according to an section of the wireless USB base home network to provided the wireless USB transfer service.

All the wireless USB devices 12 to 16 are controlled and serviced by the wireless USB host 11. The services are sequentially generated according to the management of the wireless USB host and a user's request.

But, in the structure, resources availability between various devices sharing one wireless channel may deteriorate. In addition, conflict or interference between the services may occur.

For example, in a structure where a wireless USB host constructed with one TV is shared by a camcorder, a digital camera, a storage apparatus, and other wireless USB devices and services thereof are sequentially provided, individual services such as a file transfer service and network services as well as a display service may be limited, so that wireless resources are wasted.

As another example, in a structure where a wireless USB host constructed with one beam projector is shared by various wireless USB devices such as a notebook computer according to a conventional method, conflict or interference between services may occur. As a result, any services cannot be provided.

Therefore, an optimized wireless USB transfer service needs to be provided to various wireless USB devices by performing wireless USB transfer service management capable of supporting various wireless USB devices.

DISCLOSURE OF INVENTION

Technical Problem

An aspect of the present invention provides a priority-based wireless USB transfer service management apparatus and method capable of preventing conflict or interference between service and minimizing waste of resources by providing optimized service supporting environment according to characteristics and media classes of various wireless USB devices.

Technical Solution

According to an aspect of the present invention, there is provided a priority-based wireless USB transfer service management apparatus comprising: a wireless information processing unit identifying wireless USB service data for classifying service classes from wireless data transmitted from wireless USB devices; a wireless USB detection unit extracting service information from the wireless USB service data identified by the wireless information processing unit and generating service management information; a service information management unit classifying service based on the service management information and configures service determination information by allocating priorities and weighting factors to the services; a service determination unit determining final service determination information based on the service determination information of the service information management unit and a user's request and generating service control information according to the determination of the final service determination information; and a service controlling unit controlling the wireless USB transfer service according to the service control information of the service determination unit.

According to another aspect of the present invention, there is provided a priority-based wireless USB transfer service management method comprising: integrating wireless data according to classes when the wireless data transmitted from wireless USB devices are received; identifying the integrated wireless data according to protocols and configuring service management information; classifying services based on the service management information and configuring service determination information by allocating priorities and weighting factors according to the classified services; configuring final service determination information based on a user's request corresponding to the service determination information after outputting the configured service determination information through a user interface; determining a to-be-performed service based on the final service determination information and generating service control information corresponding to the services; and controlling the wireless USB transfer services based on the service control information.

Advantageous Effects

According to the present invention, in a wireless USB based home network environment where wireless USB devices requesting various services are distributed, priorities and weighting factors are allocated to the services according to states of a wireless USB host which are determined based on wireless data of the wireless USB devices, and the services are controlled according to the priorities and weighting factors, so that it is possible to prevent conflict or interference between the services. In addition, the wireless USB apparatus and the services are managed in a hierarchical structure, so that it is possible to prevent and control various problems in advance.

In addition, the wireless USB based service management structure according to the present invention can be applied to wireless network management, wireless resources management, and wireless USB technology development. In addition, the USB based service management structure can be applied to home network, WPAN, and service contents, and the aforementioned effects can be obtained.

BRIEF DESCRIPTION OF THE DRAWINGS

FIG. 4 is a table illustrating a configuration of a service information base used for a service information management unit in the wireless USB transfer service management apparatus according to the present invention.

BEST MODE FOR CARRYING OUT THE INVENTION

Figure 1:
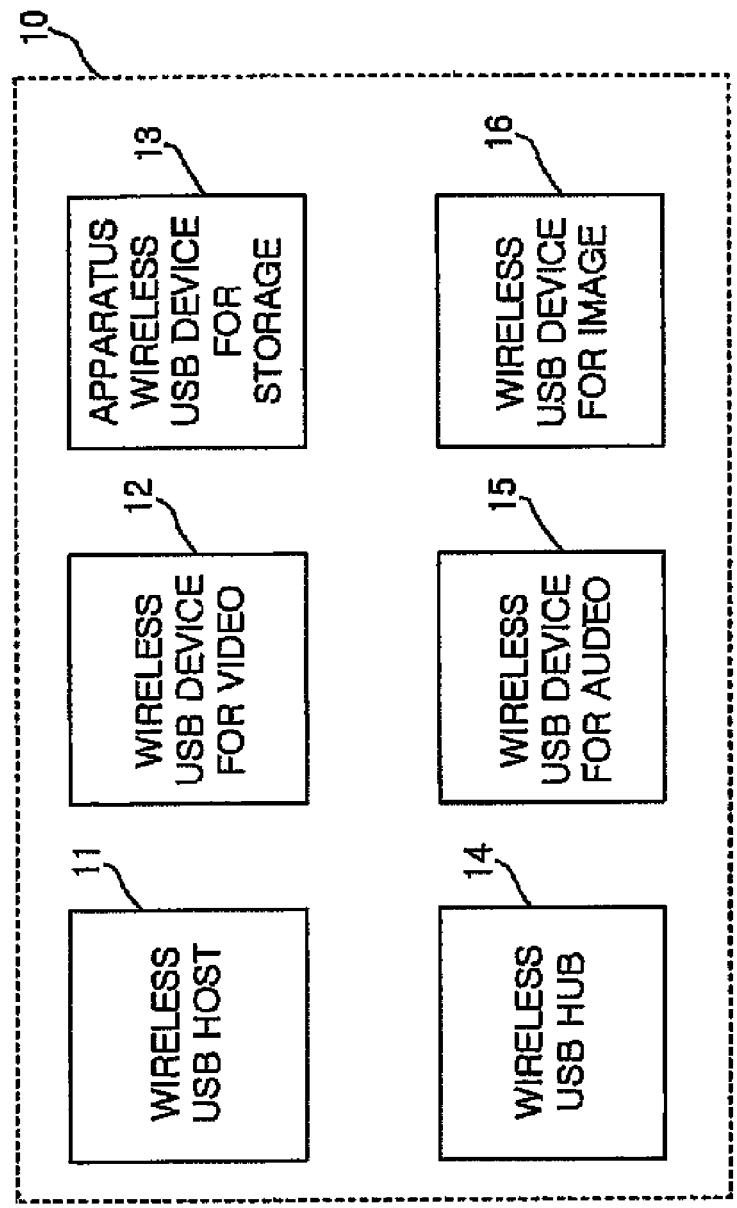
FIG. 1 is a block diagram illustrating a basic configuration of a wireless USB system.

Now, exemplary embodiments of the present invention will be described in detail with reference to the accompanying drawings so that the present invention can be easily implemented by the ordinarily skilled in the art.

However, if detailed description of well-known functions or constructions is determined not to clarifying the present invention, the detailed description thereof may be omitted.

In the accompanying drawings, elements having similar functions and operations are denoted by the same reference numerals.

In addition, in the specification, "connection of a portion to another portion" includes "electrical connection through an intermediate portion between the portions" as well as "direct connection of the portions". In addition, to "include" a component denotes to "further" include other components if there is no description of excluding the other components.

Hereinafter, exemplary embodiments of the present invention will be described in detail with reference to the accompanying drawings.

Figure 2:
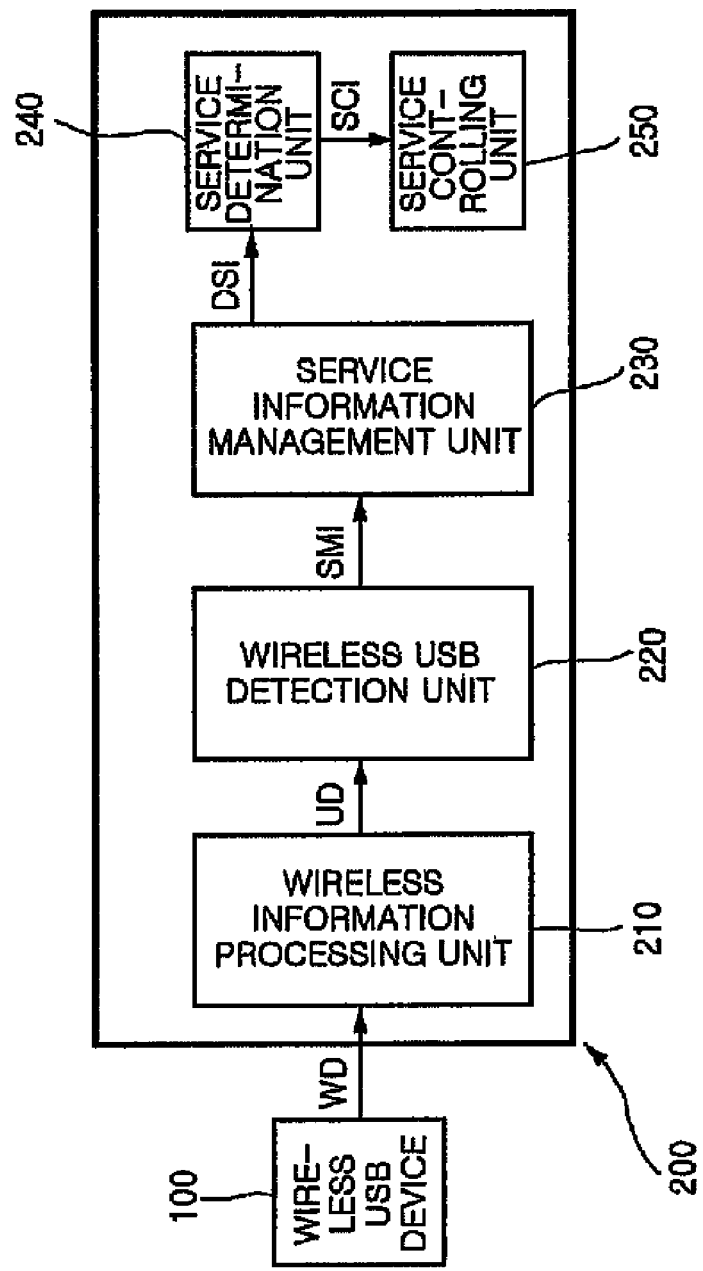
FIG. 2 is a schematic block diagram illustrating a configuration of a wireless USB transfer service management apparatus according to the present invention.

FIG. 2 is a schematic block diagram illustrating an internal configuration of a wireless USB transfer service management apparatus according to the present invention.

Referring to FIG. 2, in order to efficiently process wireless data between various wireless UBS devices 100, the wireless USB host 200 includes a wireless USB transfer service management apparatus. The wireless USB transfer service management apparatus includes a wireless information processing unit 210 which identifies wireless USB service data UD for identifying services from wireless data transmitted from the wireless USB devices 100, a wireless USB detection unit 220 which extracts service information from the wireless USB service data identified by the wireless information processing unit 210 and generates a service management information SMI, a service information management unit 230 which classifies the wireless data based on the service management information SMI according to the services and provides service determination information allocated with service priorities and weighting factors, a service determination unit 240 which determines final service determination information based on the service determination information provided by the service information management unit 230 and a user's request and generates service control information according to the determination, and a service controlling unit 250 which controls wireless data processing, so that the service can be provided in the order determined according to the service control information of the service determination unit 240.

According to the aforementioned configuration, the wireless data WD including a media class of the associated device is transmitted from the wireless USB device 100 to the wireless information processing unit 210. The wireless information processing unit 210 identifies the wireless USB service data UD from the wireless data WD and transmits the wireless USB service data UD to the wireless USB detection unit 220.

The wireless USB detection unit 220 extracts the wireless USB service information for identifying the associated service from the wireless USB service data UD and configures the service management information SMI based on the wireless USB service information.

The service management information SMI is transmitted to the service information management unit 230. The service information management unit 230 determines service priorities based on the priorities and weighting factors allocated to the media classes and apparatus attributes by using the service management information SMI and transmits the service determination information to the service determination unit 240.

The service determination unit 240 provides the service determination information provided by the service information management unit 230 to the user through a user interface of the wireless USB host 200. The service determination unit 240 determines the final service order based on the user's request associated with the service determination and provides a service control information according to the final determination to the service controlling unit 250.

The service controlling unit 250 controls the wireless USB service based on the service control information so that an optimized wireless USB transfer service can be provided to the user.

Now, detailed configuration and operations of the wireless USB transfer service management apparatus are described.

Figure 3:
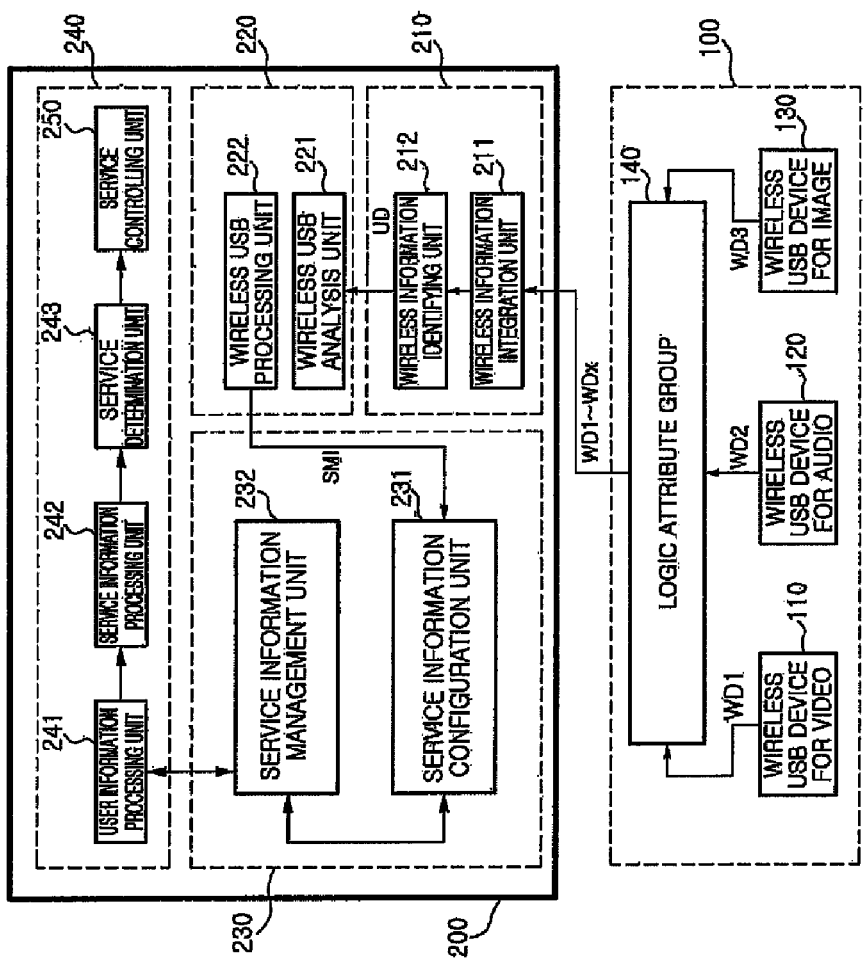
FIG. 3 is a block diagram illustrating a detailed configuration of the wireless USB transfer service management apparatus according to the present invention.

FIG. 3 is a block diagram illustrating a detail configuration of the wireless USB transfer service management apparatus according to the present invention.

Referring to FIG. 3, the wireless information processing unit 210 includes a wireless information integration unit 211 which integrates all the wireless data transmitted from various wireless USB devices 100 and a wireless information identifying unit 212 which identifies the wireless USB service data UD from the wireless data integrated by the wireless information integration unit 211 according to an transfer protocol and transmits the wireless USB service data US to the wireless USB detection unit 220. The wireless USB detection unit 220 includes a wireless USB analysis unit 221 which analyzes the wireless USB service data UD and extracts service information according to an associated USB descriptor and a wireless USB processing unit 222 which generates the service management information SMI used as a reference for determination of service priority based on the extracted service information. The service information management unit 230 includes a service information configuration unit 231 which classifies the services based on the service management information SMI with reference to a service information base and configures the service determination information by allocating the priorities and weighting factors according to the classification and a service information management unit 232 which manages the service determination information in cooperation with the service determination unit 240. The service determination unit 240 includes a user information processing unit 241 which provides the service determination information to the user and receives the user's request corresponding to the service determination information, a service information processing unit 242 which generates the final service determination information based on the service determination information and the user's request, and a service determination unit 243 which determines the to-be-performed service according to the service determination information of the service information processing unit 232, generates the service control information, and outputs the service control information to the service controlling unit 250.

Now, the operations of the wireless USB transfer service management apparatus according to the present invention are described in detail with reference to FIG. 3.

As described above, the wireless USB devices 100 may include various services classes. For example, as the wireless USB devices 100, there are a wireless USB device 110 corresponding to a video class, a wireless USB device 120 corresponding to an audio class, and a wireless USB device 130 corresponding to an image class. In addition, other wireless USB devices corresponding to other service classes may be included.

The wireless USB devices may constitute logic attribute groups according to attributes of the wireless USB devices and the wireless data WD. The logic attribute groups can be controlled by the wireless USB hub 140 or other class apparatuses.

In the present invention, the wireless USB hub 140 is also treated as a wireless USB device 100.

The wireless USB transfer service management apparatus according to the present invention receives wireless data WD1 to WDx transmitted from the wireless USB devices 100 included in various classes through the wireless information processing unit 210. The wireless USB transfer service management apparatus integrates the wireless data WD1 to WDx by the wireless information integration unit 211 of the wireless information processing unit 210 and identifies the integrated wireless data according to the transfer protocol to classify the wireless USB data UD.

The wireless USB data UD is provided to the wireless USB analysis unit 221. The wireless USB analysis unit 221 analyzes the wireless USB data UD to extract the service information and outputs the service information to the wireless USB processing unit 222. The wireless USB processing unit 222 configures the service management information SMI based on the service information. The service management information SMI includes service class, service apparatus identification information, and transfer attributes.

The service management information is transmitted to the service information configuration unit 231 of the service information management unit 230. The service information configuration unit 231 classifies the service based on the service management information SMI, configures the service determination information for determining the service order according to the classification, and outputs the service determination information to the service information management unit 232. The service information management unit 232 manages the service determination information in cooperation with the user information processing unit 241 of the service determination unit 240. Namely, when there is a user's request, the service information management unit 232 reflects the user's request on the service determination information.

Now, the operations of the service information management unit 230 are described in detail with reference to FIGS. 4 and 5.

FIG. 4 is a table illustrating a configuration of the service information base used for the service classification of the service information management unit 230. Referring to FIG. 4, the service information base 233 includes service classes of the wireless USB devices, apparatus information indicating the wireless USB devices, and transfer attributes of the services. The service class includes eight classes: Video, Audio, Communication, HID, Image, PID, Printer, and Storage according to the types of the wireless USB transfer services. The apparatus information lists names of the wireless USB devices included in the service classes. The transfer attribute lists the transfer attributes provided according to the service classes.

In the present invention, different weighting factors are allocated to the different service classes in order to define service priorities for the service classes.

Among the service classes, the video class is a service requiring real-time transfer in accordance with an isochronous USB transfer scheme. The video class is allocated with a maximum weighting factor.

The audio, image, printer, and storage classes are a service in accordance with a Bulk USB transfer scheme. The audio, image, printer, and storage classes are allocated with weighting factors Excellent, Standard, Best Effort, and Best Effort, respectively.

The HID and PID classes are a service in accordance with an Interrupt USB transfer scheme. The HID and PID classes are allocated with weighting factors Excellent and Standard.

Other communication classes are a background apparatus which is allocated with a basic weighting factor.

The configuration information of the service is defined in a USB descriptor of the wireless USB device. The configuration information of the service is formed according to the classes for implementing the associated devices.

According to the present invention, as described above, the weighting factors are allocated according to the transfer attributes of the service classes, and the to-be-performed services are determined according to the weighting factors. The determination and allocation of the weighting factors are described in detail with reference to FIG. 5.

Figure 5:
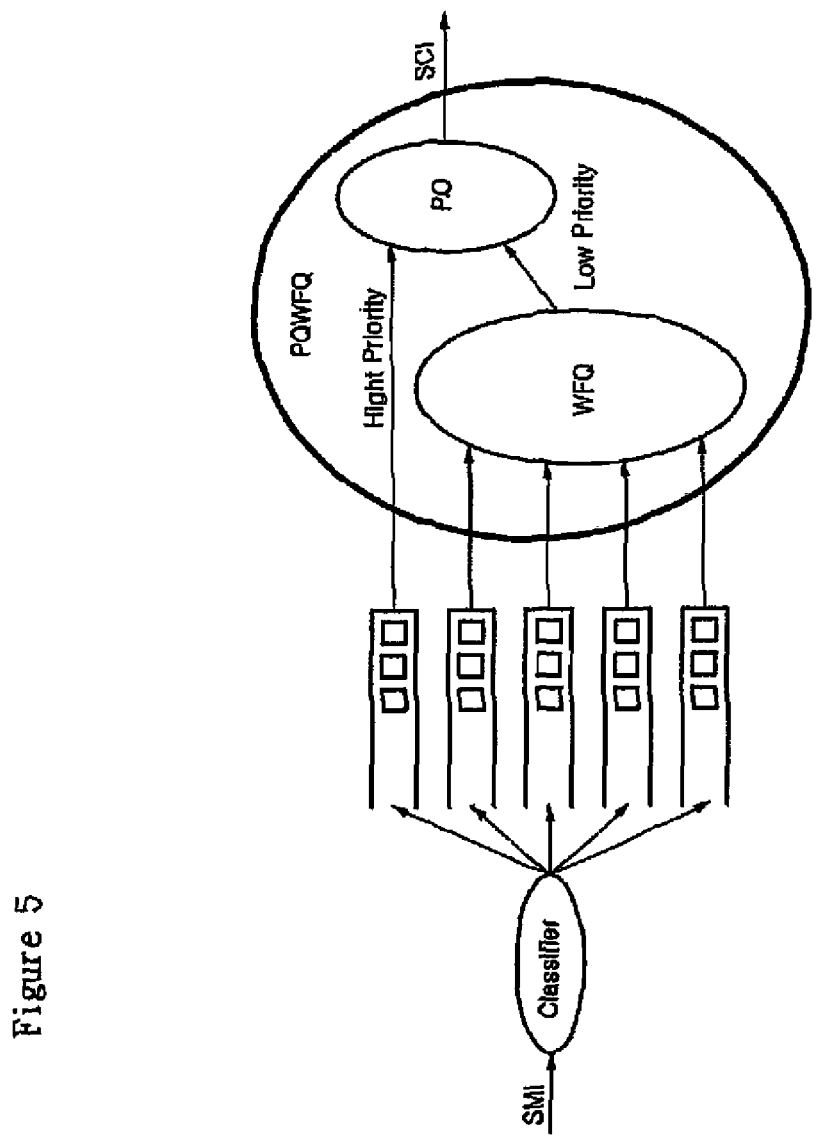
FIG. 5 is a detailed view for explaining a service configuration algorithm of the service information management unit in the wireless USB transfer service management apparatus according to the present invention.

FIG. 5 is a detailed view for explaining the operations of the service information management unit.

Referring to FIG. 5, when the service management information SMI is transmitted from the wireless USB detection unit 220, the service information management unit 230 classifies the services with reference to the service information base 233 shown in FIG. 4 and determines the weighting factors of the services.

The service weighting factors are determined by using a PQWFQ (priority queuing with weighted fair queuing) algorithm. In the present invention, a service requested by the user is classified as a high priority service, and a service providing scheme is determined according to the user's request. A service which is not requested by the user is allocated with a priority lower than that of the service reflecting the user's request. The priorities and weighting factors are allocated based on the service information base.

Therefore, the service reflecting the user's request or input is firstly serviced with a highest priority. The other services are sequentially serviced according to the weighting factors which are allocated based on the service information base.

If there is a user's request, the service that can be performed as a background service (for example, communication and file transfer) may be also serviced at the time of performing the highest priority service.

Referring to FIG. 3, as described above, the service information management unit 230 configures the service determination information SDI by allocating the weighting factors to the services according to the classes.

The user information processing unit 241 of the service determination unit 240 outputs the service determination information SDI through the user interface of the wireless USB host to notify the service determination information to the user and waits for the user's request or input. When the user's request or input occurs, the user's request or input is transmitted to the service information management unit 232, so that the user's request or input is reflected on the service determination information. Next, the service determination information reflecting the user's request or input is transmitted to the service information processing unit 242. In a case where there is no user's request or input, the service determination information that is configured based on the service information base is transmitted to the service information processing unit 242.

The service information processing unit 242 configures the final service determination information based on the user's request and the service determination information and outputs the final service determination information to the service determination unit 243. The service determination unit 243 determines the to-be-performed service based on the final service determination information and outputs the associated service control information SCI to the service controlling unit 250.

The service controlling unit 250 controls the wireless USB transfer service by using the service control information SCI.

Figure 6:
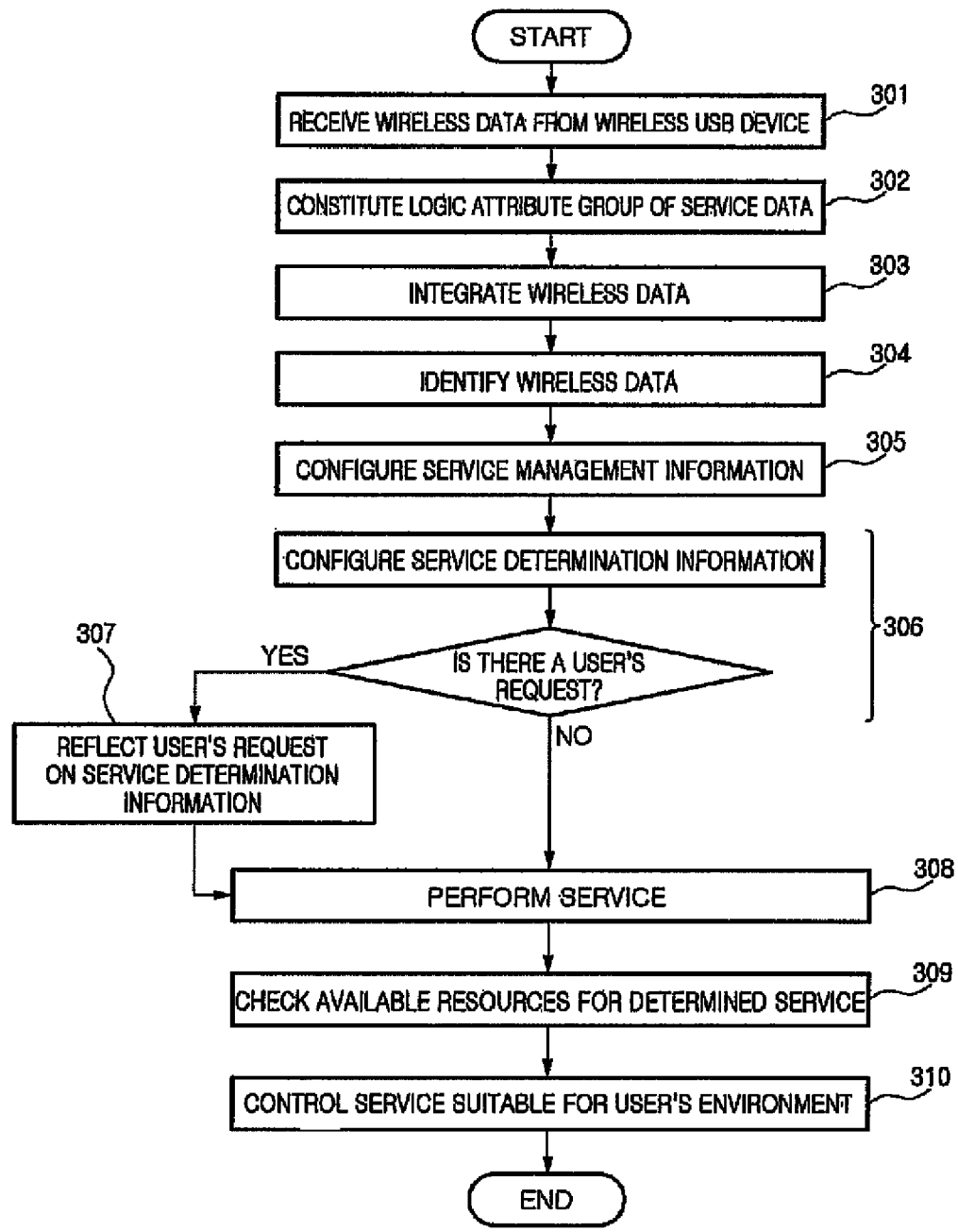
FIG. 6 is a flowchart illustrating a wireless USB transfer service management method according to the present invention.

FIG. 6 is a flowchart illustrating a wireless USB transfer service management method performed in the aforementioned service management apparatus according to the present invention.

Referring to FIG. 6, in Step 302, wireless data is received from various classes of wireless USB devices, and in Step 303, the wireless data are integrated according to the classes. In a case where the logic attribute groups are formed by the wireless USB hub 140, after the logic attribute groups are formed according to the attributes of the wireless USB apparatuses in Step 302, the wireless data are integrated.

Next, in Step 304, the wireless data are identified as the wireless USB data or other protocol data, and in Step 305, the service management information SMI is configured.

Next, in Step 306, the service determination information SDI is configured by using the service management information SMI. Next, if there is no user's request or input, the service determination information SDI is determined as the final service determination information. If there is a user's request or input, in Step 307, the final service determination information is configured based on the user's request or input.

Now, the service determination information configuration process performed in Step 306 is described in detail with reference to FIG. 7.

Figure 7:
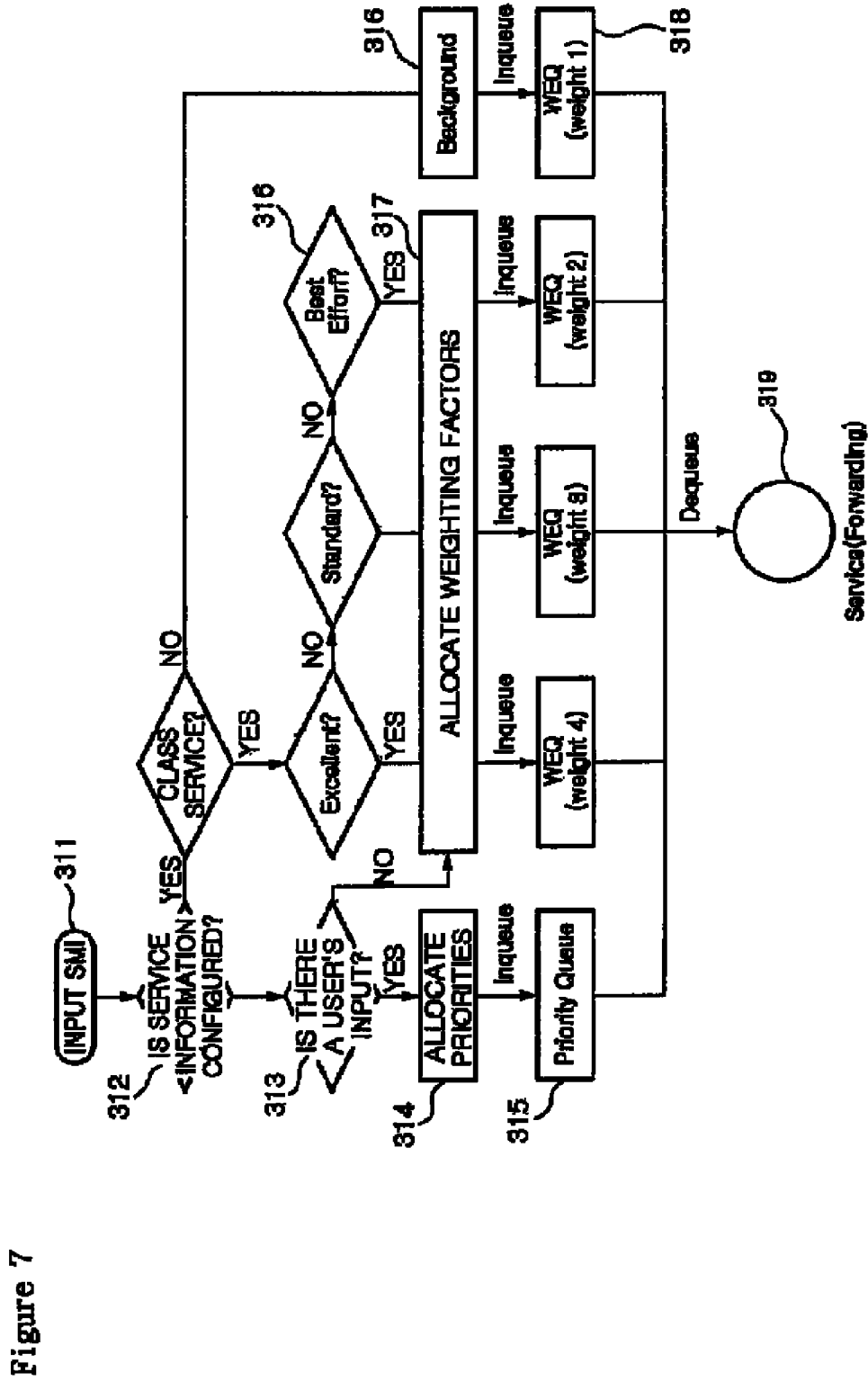
FIG. 7 is a detailed flowchart illustrating a process of determining priorities and weighting factors in the wireless USB transfer service management method according to the present invention.

FIG. 7 is a detailed flowchart illustrating a service determination information configuration process by using allocation of priorities and weighting factors in the wireless USB service management method according to the present invention.

Referring to FIG. 7, when the service management information SMI is input from the wireless USB detection unit 220 in Step 311, the service information configuration unit 231 of the service information management unit 230 determines whether or not to configure the service information in Step 312.

In a case where the service information is configured in Step 312, the service classes are classified based on the service management information SMI, and the transfer attributes (for example, Excellent, Standard, and Best-Effort) of the service class are identified in Step 316. The weighting factors are allocated to the transfer attributes in Step 317. Step 316 is performed based on the service information base 233 shown in FIG. 4.

The weighting factors are allocated to the service classes according to the service attributes defined in the service information base 233. For example, a service of attribute Excellent is allocated with a weighting factor of 4, a service of attribute Standard is allocated with a weighting factor of 3, and a service of attribute Best-Effort is allocated with a weighting factor of 2. These services are performed in the descending order of weighting factors.

A service of attribute Background such as communication and file transfer is allocated with the lowest weighting factor of 1. Therefore, the service of attribute Background is performed finally. In addition, according to the user's request, the service may be performed as a background.

The service determination information is primarily configured based on the service information base. The service determination information is displayed on the user interface to the user.

In Step 313, it is checked whether or not there is a user's input. If there is a user's input, the service determination information is configured by allocating the highest priority to the associated service.

In Step 318, according to the priorities and weighting factors that are classified in Steps 314 and 317, the wireless USB data are inserted into the corresponding queues (highest priority queue or weight factor queue). Next, in Step 319, the services are sequentially performed according to the allocated priorities and weighting factors in Step 329.

Returning to FIG. 6, the wireless USB transfer service method is described. When the final service determination information is configured in Steps 306 and 307, the to-be-performed service is determined by the service determination unit 240 aligning the finally-determined service configuration information in Step 308. In Step 309, available resources used for performing the determined service are checked. Next, in Step 310, the determined service is performed by using the available resources.

While the present invention has been shown and described in connection with the exemplary embodiments, it will be apparent to those skilled in the art that modifications and variations can be made without departing from the spirit and scope of the invention as defined by the appended claims.

The invention claimed is:

1. A priority-based wireless USB transfer service management apparatus comprising:
    a wireless information processing unit identifying wireless USB service data for classifying service classes from wireless data transmitted from wireless USB devices;
    a wireless USB detection unit extracting service information from the wireless USB service data identified by the wireless information processing unit and generating service management information;
    a service information management unit classifying service based on the service management information and configuring service determination information by allocating priorities and weighting factors to the services;
    a service determination unit determining final service determination information based on the service determination information of the service information management unit and a user's request and generating service control information according to the final service determination information; and
    a service controlling unit controlling the wireless USB transfer service according to the service control information of the service determination unit,
    wherein the wireless USB service data includes transfer attributes,
    wherein the service management information includes service classes of the wireless USB devices, apparatus information indicating the wireless USB devices, and transfer attributes of the services,
    wherein the service class includes Video, Audio, Communication, HID, Image, PID, Printer, and Storage.

2. The priority-based wireless USB transfer service management apparatus of claim 1, wherein the wireless information processing unit comprises:
    a wireless information integration unit integrating all the wireless data transmitted from the wireless USB devices according to the service classes; and
    a wireless information identifying unit identifying the wireless data integrated by the wireless information integration unit according to the transfer protocol to generate the wireless USB service data.

3. The priority-based wireless USB transfer service management apparatus of claim 1, wherein the wireless USB detection unit comprises:
    a wireless USB analysis unit analyzing the wireless USB service data and extracts service information; and
    a wireless USB processing unit generating the service management information used as a reference for determination of service priority based on the extracted service information.

4. The priority-based wireless USB transfer service management apparatus of claim 1, wherein the service information management unit comprises:
    a service information configuration unit classifying the services based on the service management information and configuring the service determination information by allocating the priorities and weighting factors according to a result of the classification; and
    a service information management unit receiving a user's request and managing the service determination information in cooperation with the service determination unit.

5. The priority-based wireless USB transfer service management apparatus of claim 4, wherein the service information management unit further comprises a service information base storing wireless USB apparatus information and transferring attributes according to the service classes, and wherein the service information configuration unit classifies the services with reference to a service information base and allocating the priorities and weighting factors according to the transfer attribute.

6. The priority-based wireless USB transfer service management apparatus of claim 5, wherein, when there is the user's request, the service information management unit allocates the associated service with a high priority, and
    wherein, when there is no user's request, the service information management unit allocates the associated service with a low priority and a weighting factor according to the transfer attribute of the service information base.

7. The priority-based wireless USB transfer service management apparatus of claim 1, wherein the service determination unit comprises:
    a user information processing unit providing the service determination information provided by the service information management unit through a user interface to the user and receives the user's request corresponding to the service determination information;
    a service information processing unit configuring the final service determination information based on the user's request received from the user information processing unit and the service determination information configured by the service information management unit; and
    a service determination unit determining a to-be-performed service according to the service determination information determined by the service information processing unit, generates the service control information, and outputs the service control information to the service controlling unit.

8. A priority-based wireless USB transfer service management method comprising:
    integrating the wireless data transmitted from wireless USB devices according to classes;
    identifying the integrated wireless data according to protocols and configuring service management information;
    classifying services based on the service management information and configuring service determination information by allocating priorities and weighting factors according to the classified services;
    outputting the configured service determination information through a user interface and configuring final service determination information based on a user's request corresponding to the service determination information;
    determining a to-be-performed service based on the final service determination information to generating service control information corresponding to the services; and controlling the wireless USB transfer services based on the service control information, wherein the service management information includes service classes of the wireless USB devices, apparatus information indicating the wireless USB devices, and transfer attributes of the services, wherein the service class includes Video, Audio, Communication, HID, Image, PID, Printer, and Storage.

9. The priority-based wireless USB transfer service management method of claim 8, wherein the configuring the service determination information is performed by classifying the services with reference to a service information base for identifying service apparatuses and transfer attributes according to the service classes and allocating predetermined weighting factors according to the classified service classes.

10. The priority-based wireless USB transfer service management method of claim 9, wherein the configuring the final service determination information is performed by:

outputting the service determination information through the user interface and checking whether or not there is a user's request corresponding to the service determination information; and when there is the user's request, allocating the associated service with a high priority, and when there is no user's request, allocating the associated service with a low priority and the weighting factor that is allocated in the step of configuring the service determination information.

\* \* \* \* \*